United States Patent
Yokohata et al.

(10) Patent No.: US 10,323,966 B2
(45) Date of Patent: Jun. 18, 2019

(54) FLOW RATE MEASUREMENT DEVICE (71) Applicant: Panasonic Intellectual Property Management Co., Ltd., Osaka-shi, Osaka (JP)

(72) Inventors: Mitsuo Yokohata, Osaka (JP); Yusuke Kitano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 210 days.

(21) Appl. No.: 15/537,266

(22) PCT Filed: Nov. 15, 2016

(86) PCT No.: PCT/JP2016/004880
§ 371 (c)(1),
(2) Date: Jun. 16, 2017

(87) PCT Pub. No.: WO2017/110034
PCT Pub. Date: Jun. 29, 2017

(65) Prior Publication Data
US 2018/0052023 A1 Feb. 22, 2018

(30) Foreign Application Priority Data
Dec. 24, 2015 (JP) ................. 2015-251566

(51) Int. Cl.
*F23N 5/18* (2006.01)
*G01F 1/66* (2006.01)
(Continued)

(52) U.S. Cl.
CPC ............. *G01F 1/667* (2013.01); *F23N 5/18* (2013.01); *F23N 5/184* (2013.01); *F23N 5/242* (2013.01);
(Continued)

(58) Field of Classification Search
CPC ................. F23N 5/18; G01F 1/66; G01F 3/22
See application file for complete search history.

(56) References Cited

U.S. PATENT DOCUMENTS 8,997,686 B2 * 4/2015 Ding .................. C23C 16/448
118/695
9,200,939 B2 * 12/2015 Iwamoto ............... G01F 15/005
(Continued)

FOREIGN PATENT DOCUMENTS

| JP | 2713065 B | 2/1998 |
|---|---|---|
| JP | 2011-095200 | 5/2011 |
| JP | 5239876 B | 7/2013 |

OTHER PUBLICATIONS

International Search Report of PCT application No. PCT/JP2016/004880 dated Jan. 24, 2017.

*Primary Examiner* — Jewel V Dowtin
(74) *Attorney, Agent, or Firm* — Brinks Gilson & Lione (57) ABSTRACT

A gas meter that is a flow rate measurement device includes a flow rate measurement unit for measuring, at a constant time interval, a flow rate of gas flowing in a passage, a pressure measurement unit for measuring pressure of the gas in the passage, a power supply unit for supplying power to a pressure measurement unit, and an appliance determination unit for determining an appliance being used based on a gas flow rate value. The gas meter further includes a measurement interval controller for determining a gas non-use state, an appliance determination performing state, or an appliance determination non-performing state based on the gas flow rate value and operation information of the appliance determination unit, for controlling the power supply unit in accordance with the determined state, and for changing an interval for turning on/off power supplied to the pressure measurement unit.

6 Claims, 6 Drawing Sheets (51) Int. Cl.
*G01F 3/22* (2006.01)
*G01F 15/04* (2006.01)
*F23N 5/24* (2006.01)

(52) U.S. Cl.
CPC ........ *G01F 15/04* (2013.01); *F23N 2005/185* (2013.01); *F23N 2025/04* (2013.01); *F23N 2039/04* (2013.01); *F23N 2041/08* (2013.01)

(56) References Cited

U.S. PATENT DOCUMENTS

| | | | |
|---|---|---|---|
| 9,348,339 B2* | 5/2016 | Ding | G05D 7/0635 |
| 9,574,917 B2* | 2/2017 | Hidaka | G01F 1/363 |
| 9,664,549 B2* | 5/2017 | Sakaguchi | G01F 1/66 |
| 2009/0248213 A1* | 10/2009 | Gotoh | G05D 7/0635 |
| | | | 700/282 |
| 2012/0221259 A1 | 8/2012 | Yokohata | |
| 2018/0348030 A1* | 12/2018 | Chen | G01F 1/6847 |

* cited by examiner

| ABSOLUTE FLOW RATE Q(n) | DIFFERENCE FLOW RATE ΔQ | CODE |
|---|---|---|
| Q(n) ≠ 0 | 400 < \|ΔQ\| | F |
| | 300 < \|ΔQ\| ≤ 400 | E |
| | 250 < \|ΔQ\| ≤ 300 | D |
| | 200 < \|ΔQ\| ≤ 250 | C |
| | 175 < \|ΔQ\| ≤ 200 | B |
| | 150 < \|ΔQ\| ≤ 175 | A |
| | 125 < \|ΔQ\| ≤ 150 | 9 |
| | 100 < \|ΔQ\| ≤ 125 | 8 |
| | 75 < \|ΔQ\| ≤ 100 | 7 |
| | 50 < \|ΔQ\| ≤ 75 | 6 |
| | 40 < \|ΔQ\| ≤ 50 | 5 |
| | 30 < \|ΔQ\| ≤ 40 | 4 |
| | 20 < \|ΔQ\| ≤ 30 | 3 |
| | 10 < \|ΔQ\| ≤ 20 | 2 |
| | \|ΔQ\| ≤ 10 | 1 |
| Q(n) = 0 | FLOW RATE: ZERO | 0 |

FIG. 4

| TIME | FLOW RATE VALUE Q(n) | DIFFERENCE VALUE \|ΔQ\| | CODE |
|---|---|---|---|
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 48 | 48 | 5 |
| 11 | 54 | 6 | 1 |
| 12 | 50 | 4 | 1 |
| 13 | 52 | 2 | 1 |
| 14 | 74 | 22 | 3 |
| 15 | 106 | 32 | 4 |
| 16 | 134 | 28 | 3 |
| 17 | 160 | 26 | 3 |
| 18 | 184 | 24 | 3 |
| 19 | 180 | 4 | 1 |
| 20 | 184 | 4 | 1 |
| 21 | 182 | 2 | 1 |
| 22 | 180 | 2 | 1 |
| 23 | 180 | 0 | 1 |
| 24 | 184 | 4 | 1 |
| 25 | 180 | 4 | 1 |
| 26 | 184 | 4 | 1 |
| 27 | 182 | 2 | 1 |
| 28 | 178 | 4 | 1 |
| 29 | 180 | 2 | 1 |
| 30 | 180 | 0 | 1 |
| 31 | 182 | 2 | 1 |
| 32 | 180 | 2 | 1 |

Rows 11–13: TARGET RANGE OF INTERMEDIATE STEADY FLOW RATE

Rows 19–24: TARGET RANGE OF STEADY FLOW RATE

FLOW RATE MEASUREMENT DEVICE

This application is a 371 application of PCT/JP2016/004880 having an international filing date of Nov. 15, 2016, which claims priority to JP 2015-251566 filed Dec. 24, 2015, the entire contents of which are incorporated herein by reference.

TECHNICAL FIELD

The present invention relates to a technique for determining, by detecting a change in flow rate of a fluid, an appliance that uses the fluid.

BACKGROUND ART

A gas meter device detects a change in flow rate of a fluid in a fluid piping system to determine an appliance that uses the fluid (for example, PTL 1 and PTL 2). Gas appliances include fan heaters, gas tables, water heaters, floor heating systems, and the like. Since a characteristic of a change in flow rate of gas upon ignition or the like differs in each gas appliance, a gas appliance being used can be determined by recognizing the characteristic of the change in flow rate. PTL 3 discloses a device for monitoring, by measuring pressure in a gas pipe, whether gas pressure is normal or abnormal.

CITATION LIST

Patent Literature

PTL 1: Unexamined Japanese Patent Publication No. 2011-95200
PTL 2: Japanese Patent No. 529,876
PTL 3: Japanese Patent No. 2,713,065

SUMMARY OF THE INVENTION

Pressure in a gas pipe should be kept constant in a household. However, a pressure value in a gas pipe may vary depending on how the pipe is installed in a household, a temperature in the gas pipe, and the like. If pressure in a gas pipe changes, a gas flow rate value may also change. Therefore, a measured flow rate may vary even though an identical gas appliance is used. It is desired that an appliance is accurately determined even in such a situation where pressure in a gas pipe varies.

A possible action in order to accurately determine an appliance is to measure pressure in a gas pipe, and to correct a gas flow rate value in accordance with the obtained pressure value. For example, since a gas flow rate increases when pressure of gas is higher, by correcting a flow rate value measured by a gas flow meter to a smaller value to determine an appliance with the corrected flow rate value, the appliance can accurately be determined. In addition, for example, since a gas flow rate lowers when pressure of gas is lower, by correcting a flow rate value measured by the gas flow meter to a greater value to determine an appliance with the corrected flow rate value, the appliance can accurately be determined.

A flow rate measurement device used as a household gas meter is normally required to use a battery as a power supply, and the battery is required to last for ten years. In such a flow rate measurement device operating with a battery, it is desired that power consumption is suppressed as much as possible.

As described above, by measuring pressure in a gas pipe, and correcting a gas flow rate value in accordance with the measured pressure value, an appliance can accurately be determined. However, operating a pressure gauge for measuring pressure leads to increased power consumption.

The present invention provides a flow rate measurement device with increased appliance determination accuracy and low power consumption.

An exemplary flow rate measurement device according to the present specification includes a flow rate measurement unit for measuring, at a constant time interval, a flow rate of gas flowing in a passage, a pressure measurement unit for measuring pressure of the gas in the passage, a power supply unit for supplying power to the pressure measurement unit, and an appliance determination unit for determining an appliance being used based on a gas flow rate value. The flow rate measurement device further includes a measurement interval controller for determining a gas non-use state, an appliance determination performing state, or an appliance determination non-performing state based on the gas flow rate value and operation information of the appliance determination unit, for controlling the power supply unit in accordance with the determined state, and for changing an interval for turning on/off power supplied to the pressure measurement unit.

With the flow rate measurement device according to the present invention, appliance determination accuracy can be increased, and power consumption can be suppressed.

DETAILED DESCRIPTION OF THE EXEMPLARY EMBODIMENT

A flow rate measurement device according to an exemplary embodiment of the present invention will now be described herein with reference to the accompanied drawings. In the exemplary embodiment described below, a gas meter is used as an example of the flow rate measurement device, and its operation processes will be described. Identical components are denoted with identical reference marks in the drawings, and each of the components is described only once to avoid repeated descriptions. The present invention is not limited to the exemplary embodiment described below.

Figure 1:
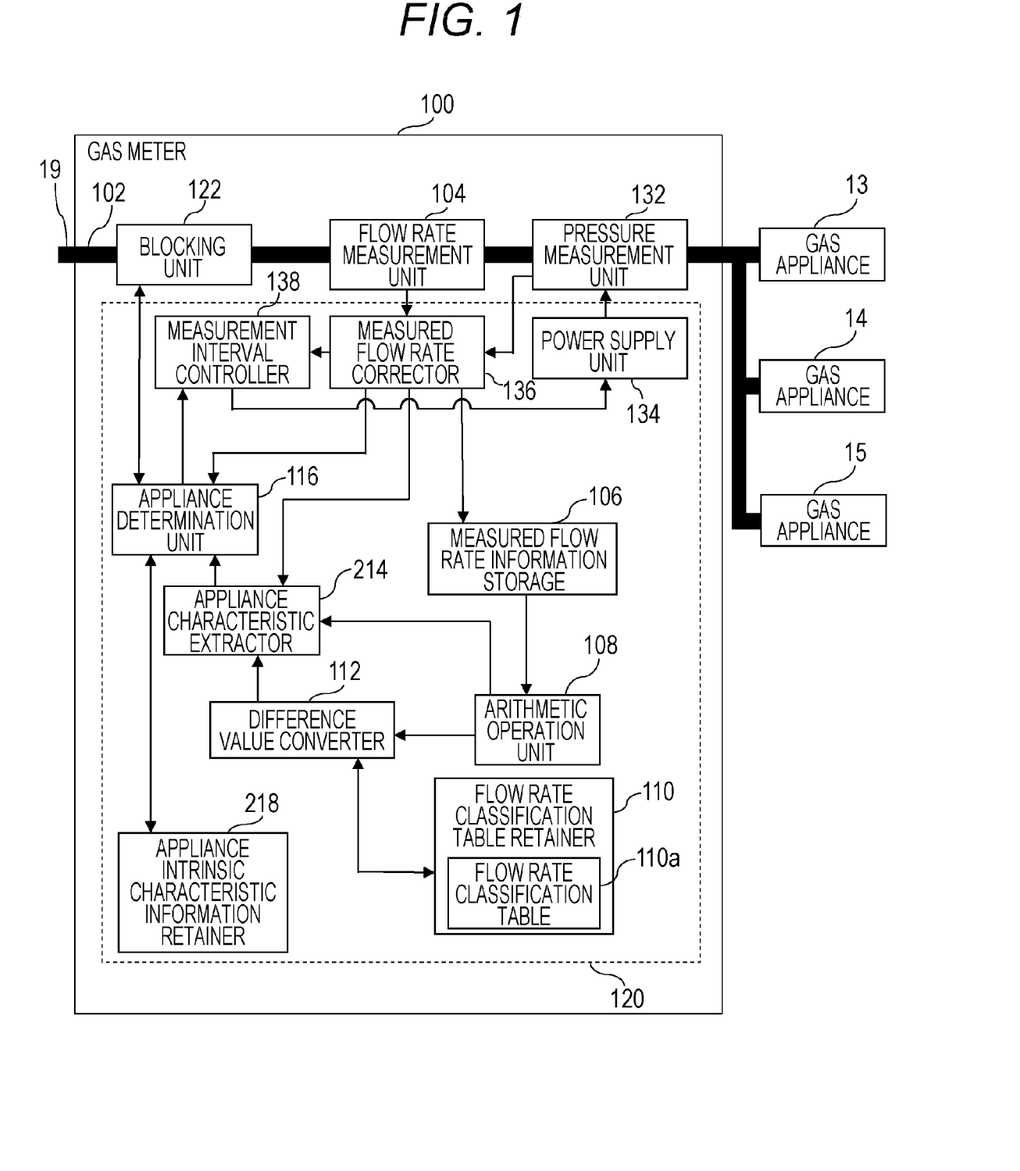
FIG. 1 is a block diagram of a flow rate measurement device according to an exemplary embodiment of the present invention.

FIG. 1 is a block diagram of gas meter 100 that is a flow rate measurement device according to the exemplary embodiment of the present invention. Gas meter 100 includes gas passage 102, flow rate measurement unit 104, measured flow rate information storage 106, arithmetic operation unit 108, flow rate classification table retainer 110, difference value converter 112, appliance characteristic extractor 214, and appliance determination unit 116. Gas meter 100 further includes appliance intrinsic characteristic information retainer 218, pressure measurement unit 132, power supply unit 134, measured flow rate corrector 136, and measurement interval controller 138. Gas meter 100 further includes blocking unit 122 disposed in gas passage 102 for blocking gas in an event of emergency.

Controller 120, for example, can achieve measured flow rate information storage 106, arithmetic operation unit 108, flow rate classification table retainer 110, difference value converter 112, appliance characteristic extractor 214, appliance determination unit 116, appliance intrinsic characteristic information retainer 218, power supply unit 134, measured flow rate corrector 136, and measurement interval controller 138 shown in FIG. 1. Controller 120 is, for example, a microcomputer.

Gas meter 100 that is the flow rate measurement device is connected, on an upstream side, to gas pipe passage 19 and is connected, on a downstream side, to various gas appliances 13, 14, 15 such as a gas table, a fan heater, a floor heating system, and the like.

Figure 2:
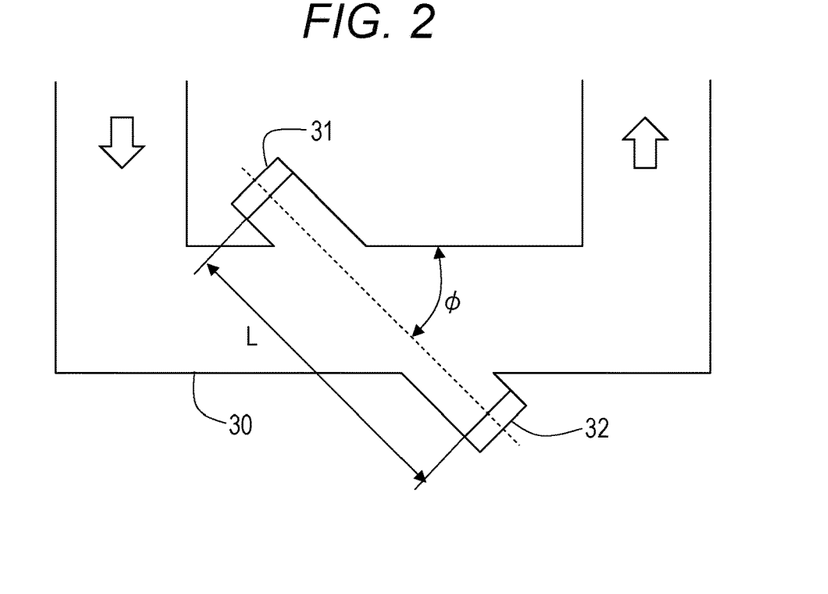
FIG. 2 is a schematic configuration view of a flow rate measurement unit according to the exemplary embodiment of the present invention.

Flow rate measurement unit 104 is, for example, an ultrasonic flow meter. An ultrasonic flow meter emits ultrasonic waves at a constant time interval toward gas as a fluid flowing in gas passage 102 to measure its flow rate. FIG. 2 is a schematic configuration view of flow rate measurement unit 104. Flow rate measurement unit 104 includes measurement passage 30 that has a rectangular cross section and that is in communication with gas passage 102. A pair of ultrasonic transceivers 31, 32 is respectively disposed on upstream and downstream sides of opposing passage walls of measurement passage 30. Between ultrasonic transceivers 31, 32, an ultrasonic transmission path is set so as to obliquely cross a gas flow flowing in measurement passage 30. Ultrasonic transceivers 31, 32 alternately transmit and receive ultrasonic waves, so that the ultrasonic waves are transmitted in forward and backward directions with respect to the gas flow. A direction of the gas flow is indicated by an arrow shown in FIG. 2.

At this time, flow velocity V can be obtained with a following equation, when a distance between ultrasonic transceivers 31, 32, that is, a measurement distance is specified to L, an angle of the ultrasonic transmission path with respect to the gas flow is specified to φ, an ultrasonic wave transmission time from upstream to downstream of ultrasonic transceivers 31, 32 is specified to t1, an ultrasonic wave transmission time from downstream to upstream is specified to t2, and a sound velocity is specified to C.

Transmission time t1 since transmission of an ultrasonic wave from ultrasonic transceiver 31 until the ultrasonic wave reaches ultrasonic transceiver 32 can be obtained with a following equation.

$$t1 = L/(C + V \cos \varphi)) \tag{1}$$

Transmission time t2 since transmission of an ultrasonic wave from ultrasonic transceiver 32 until the ultrasonic wave reaches ultrasonic transceiver 31 can be obtained with a following equation.

$$t2 = L/(C - V \cos \varphi)) \tag{2}$$

By deleting sound velocity C of the fluid from equations (1) and (2), a following equation can be obtained.

$$V = (L/(2 \cos \varphi)) \times ((1/t1) - (1/t2)) \tag{3}$$

By using flow velocity V and a cross-sectional area of measurement passage 30, an instantaneous flow rate of the gas flow can be calculated. A desired time interval may be applied for measuring an instantaneous flow rate. For example, an interval may be 0.5 seconds, 1 second, or 2 seconds.

Pressure measurement unit 132 is, for example, a digital pressure sensor. Each time power is supplied from power supply unit 134, pressure measurement unit 132 measures pressure of gas in gas passage 102.

In accordance with a gas pressure value measured by pressure measurement unit 132, measured flow rate corrector 136 corrects a gas flow rate value measured by flow rate measurement unit 104. For example, when pressure of gas is higher than predetermined standard pressure, a gas flow rate increases than a gas flow rate when pressure of the gas is at the standard pressure. Therefore, a flow rate value measured by the gas flow meter is corrected to a lower value. In addition, for example, when pressure of gas is lower than the standard pressure, a gas flow rate is lower than a gas flow rate when pressure of the gas is at the standard pressure. Therefore, a flow rate value measured by the gas flow meter is corrected to a greater value.

Bernoulli's law, for example, can be applied to correct a flow rate value in accordance with a pressure value. As an example, an approximation for correcting a flow rate to a flow rate at standard pressure of an LP gas is shown below.

$$Q = q^* \{(0.25^* p - 1.06)^2 + 0.87\} \tag{4}$$

Where, q is a measured flow rate value, p is a measured pressure value, and Q is a corrected flow rate value.

For example, when a measured flow rate value is 108.1 L/h, and a pressure value is 3.3 kPa, $$Q1 = 108.1^* \{(0.25^* 3.3 - 1.06)2 + 0.87\}$$

is satisfied, and therefore corrected flow rate value Q1 is approximately 100 L/h.

In addition, for example, when a measured flow rate value is 88.5 L/h, and a pressure value is 2.2 kPa, $$Q2 = 88.5^* \{(0.25^* 2.2 - 1.06)2 + 0.87\}$$

is satisfied, and therefore corrected flow rate value Q2 is approximately 100 L/h.

When a pressure value measured by pressure measurement unit 132 is equal to or around the above-described standard pressure, measured flow rate corrector 136 may not correct the pressure value measured by pressure measurement unit 132, but output the pressure value as is. When a pressure value is equal to or around the standard pressure, an appliance can accurately be determined without making any corrections, and, in such a case, since no arithmetic operation for a correction is performed, power consumption can be suppressed.

Measured flow rate information storage 106 stores target data described with a gas flow rate value output from measured flow rate corrector 136 and a measurement time at which the flow rate value is measured, both of which are associated to each other.

Arithmetic operation unit 108 calculates a difference value of gas flow rate values per constant time equivalent to the above-described ultrasonic emission interval. For example, when a flow rate (absolute flow rate) at a predetermined timing is 90 L/h (liter per hour), and a flow rate at a next timing is 120 L/h, a difference value can be calculated through 120−90=30 L/h.

Figure 3:
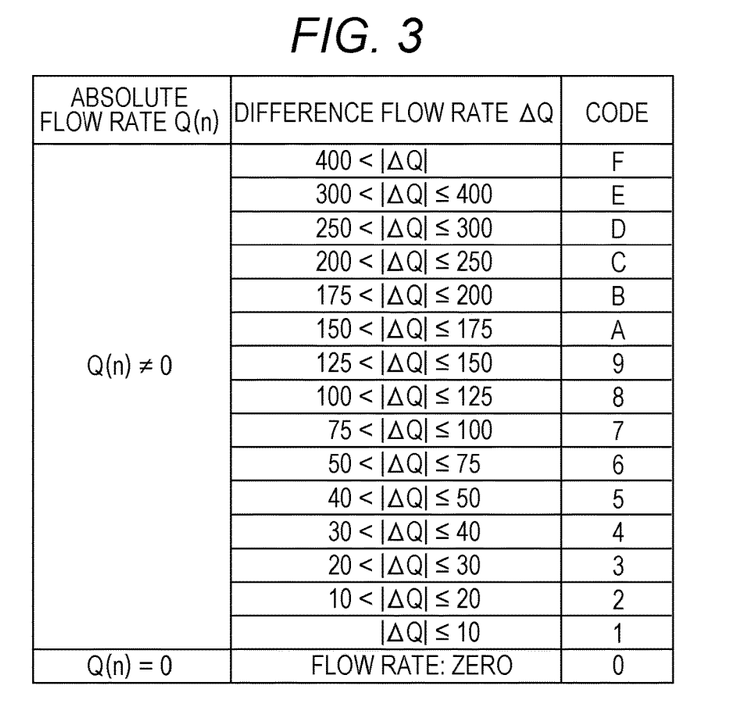
FIG. 3 is a flow rate classification table according to the exemplary embodiment of the present invention.

Flow rate classification table retainer 110 retains, for example, as shown in FIG. 3, flow rate classification table 110a in which classifications of a plurality of difference values, which correspond to magnitudes of the difference values, and codes representing the respective classifications are associated to each other. Flow rate classification table 110a takes a role of a conversion table in which absolute values of measured difference values are classified into predetermined classifications, and converted into predetermined codes representing the respective classifications. A number of classifications in flow rate classification table 110a is not particularly limited. In FIG. 3, as an example, classifications are made into 16 codes. A range has been provided, where a flow rate is determined to zero. However, since flow rates measured in an actual device might not be uniform more or less, it is less likely that a flow rate is determined to be completely zero. A flow rate determined to be zero therefore includes almost zero and substantially zero.

Classification ranges are each subdivided into different flow rates. Ranges with smaller difference values in flow rate are subdivided by smaller numbers, such as codes "1" to "5" are subdivided by 10 L/h, codes "6" to "B" are subdivided by 25 L/h, codes "C" to "D" are subdivided by 50 L/h, and code "E" is subdivided by 100 L/h. Since there are many types of appliances in a range where difference values are smaller, shortening an interval can increase determination accuracy. Since decimal numbers of "10" to "15" are expressed in hexadecimal numbers for codes "A" to "F", the codes can be regarded as numeric values and compared in size.

Difference value converter 112 converts a difference value calculated by arithmetic operation unit 108 into, based on flow rate classification table 110a, a code representing a classification where a difference value per constant time (of ultrasonic wave emission) is classified.

Appliance characteristic extractor 214 creates, based on a collection of codes per constant time, which are obtained from difference value converter 112, an extraction code string representing a characteristic of an appliance from a measurement code string that is a string of codes obtained through actual measurements. This measurement code string simulatively represents a change in flow rate of a fluid. Appliance characteristic extractor 214 records as required an extraction code string representing a characteristic of an appliance in a memory (not shown). In addition, appliance characteristic extractor 214 monitors a gas flow rate value output from measured flow rate corrector 136, extracts, from a transition of flow rates, a plurality of appliance characteristic flow rates representing characteristics of appliances, such as a gentle ignition flow rate of a fan heater, and records as required the plurality of appliance characteristic flow rates in the memory (not shown).

Appliance determination unit 116 determines, based on extraction code strings extracted by appliance characteristic extractor 214 and the appliance characteristic flow rates, a gas appliance that uses gas as a fluid. In appliance intrinsic characteristic information retainer 218, appliance intrinsic characteristic code strings representing characteristic code strings intrinsic to gas appliances, and a plurality of appliance characteristic flow rates intrinsic to gas appliances are stored in advance for each gas appliance. Appliance determination unit 116 compares an extraction code string with an appliance intrinsic characteristic code string stored in appliance intrinsic characteristic information retainer 218, and/or compares a gas flow rate value output from measured flow rate corrector 136 with an appliance characteristic flow rate stored in appliance intrinsic characteristic information retainer 218, to determine a gas appliance that uses gas based on similarity relationships and the like.

An appliance characteristic extraction process to be performed by the flow rate measurement device configured as described above will now be described herein.

First, flow rate (absolute flow rate) $Q(n)$ obtained through a measurement after a constant time interval (for example, 0.5 seconds), and flow rate $Q(n-1)$ obtained through a previous measurement are once stored in measured flow rate information storage 106. Thereafter, arithmetic operation unit 108 calculates difference value $\Delta Q(n)=Q(n)-Q(n-1)$, which is a difference between flow rate $Q(n)$ and flow rate $Q(n-1)$.

Figure 4:
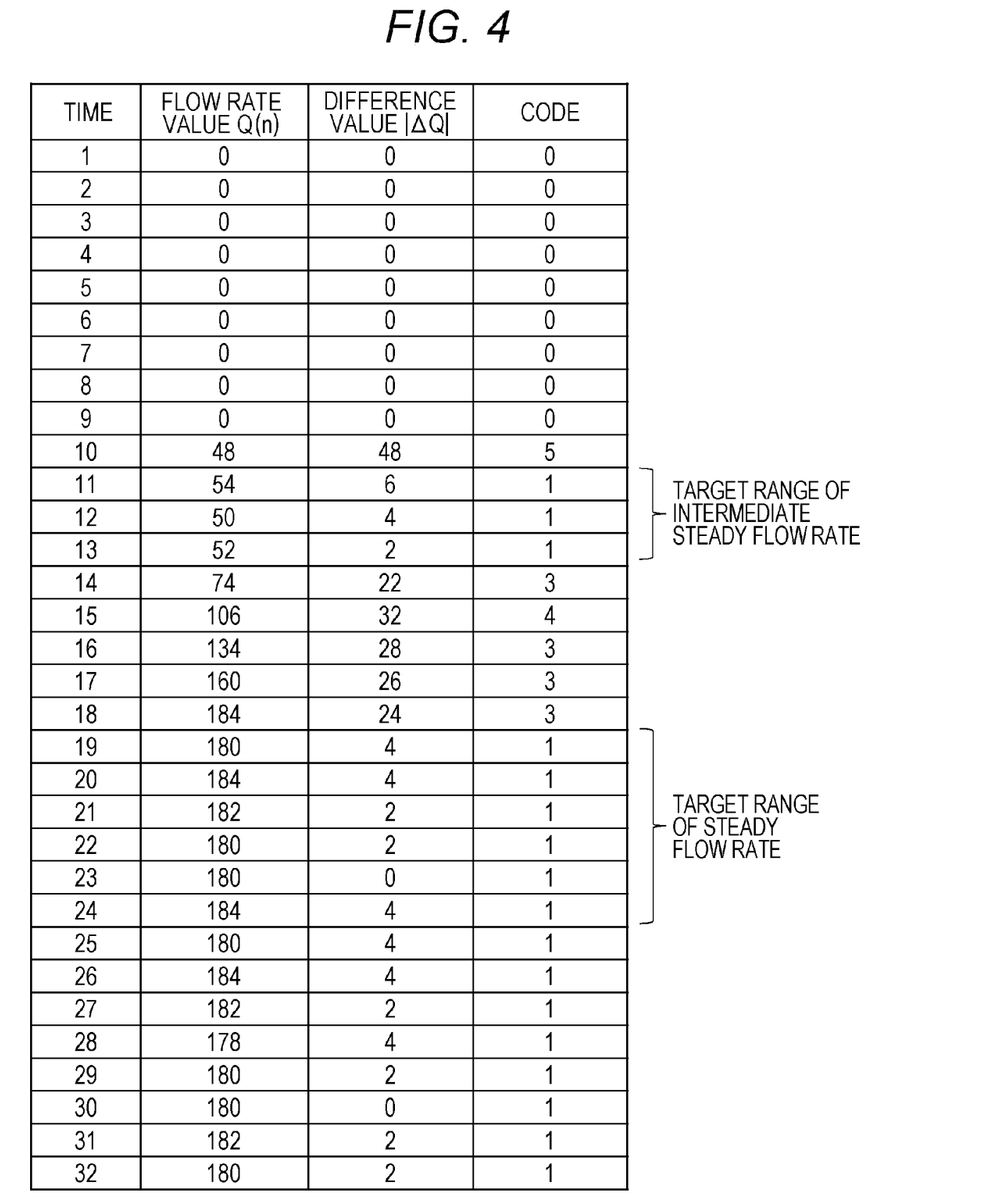
FIG. 4 is an example table of code conversions using the flow rate classification table according to the exemplary embodiment of the present invention.
Figure 5:
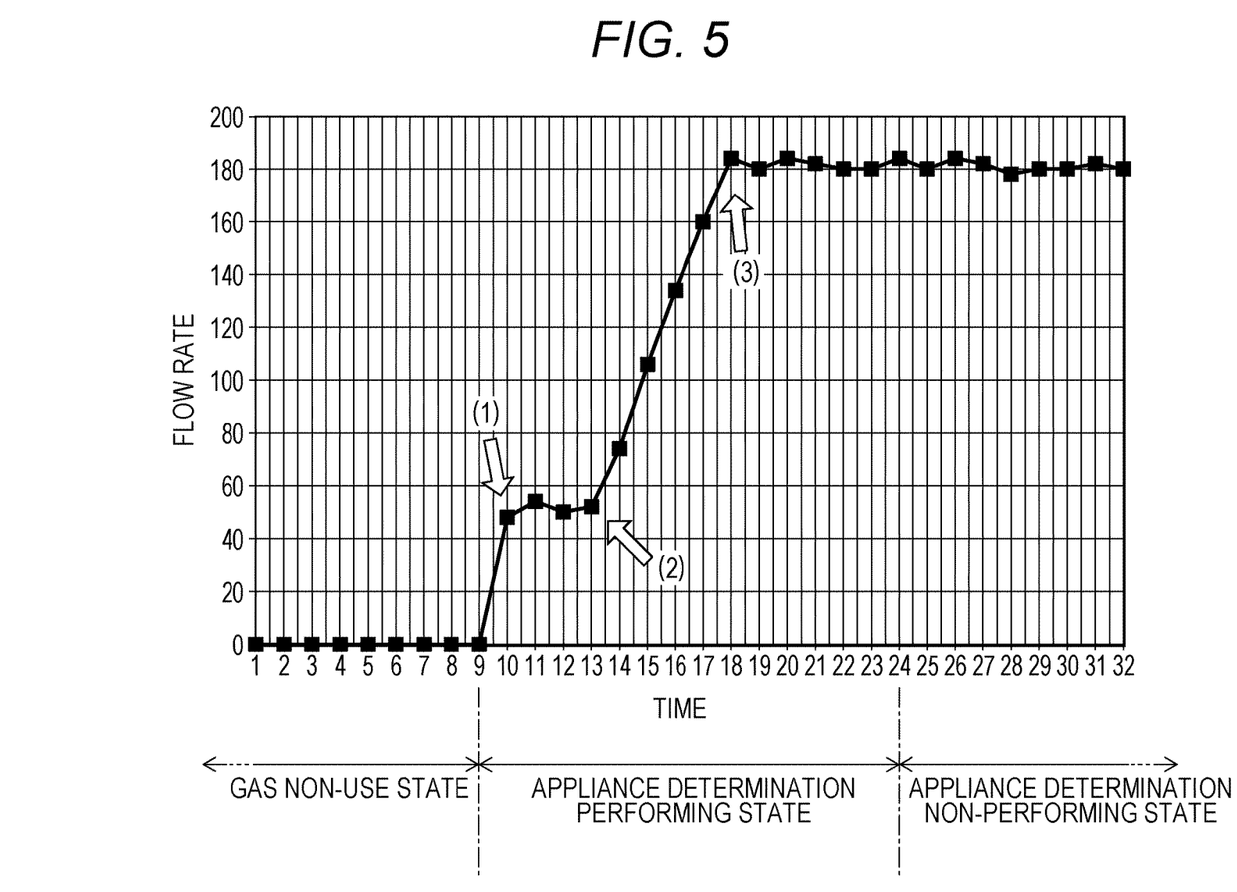
FIG. 5 is a graph illustrating changes in flow rate of gas, according to the exemplary embodiment of the present invention.

Difference value converter 112 refers to flow rate classification table 110a as shown in FIG. 3 to convert an absolute value of difference value $\Delta Q(n)$ calculated by arithmetic operation unit 108 into a classification code that is a code representing a classification where a difference value per constant time is classified. FIG. 4 shows an example conversion using flow rate classification table 110a. FIG. 5 is a graph illustrating changes in flow rate of gas, and FIG. 6 is a graph of code transition.

Figure 6:
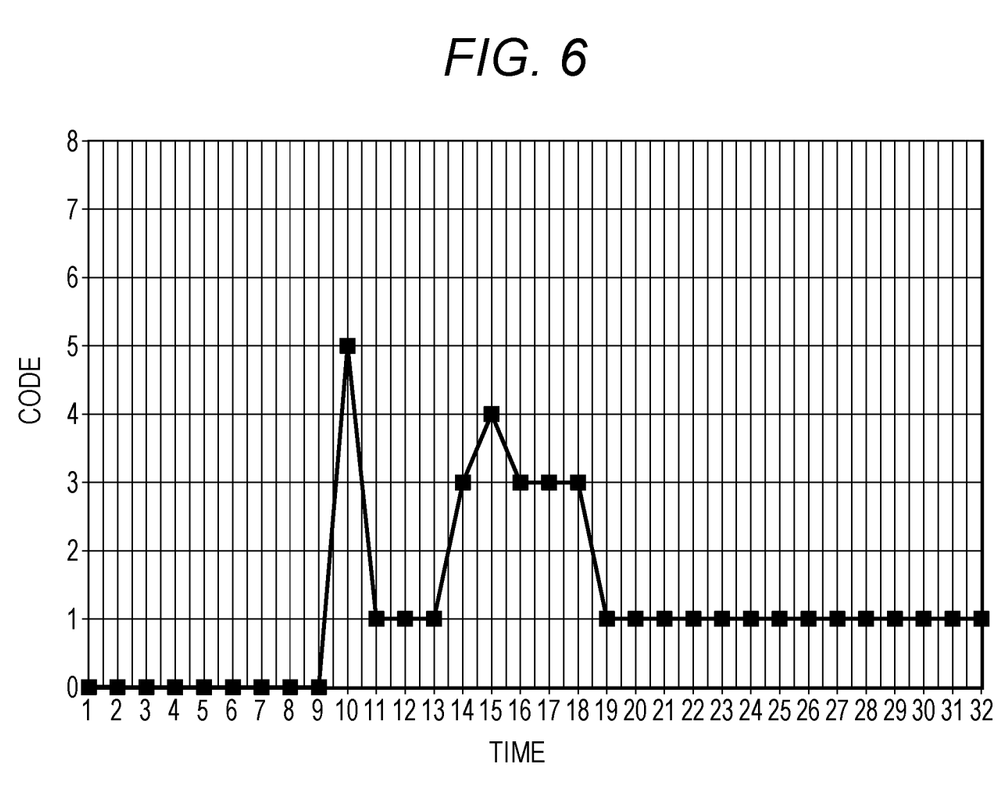
FIG. 6 is a graph of code transition, according to the exemplary embodiment of the present invention.

A period from time "1" to time "9" shown in FIGS. 4 to 6 shows a state where no gas appliance is used, in other words, a gas non-use state. At this time, flow rate $Q(n)=0$ is satisfied, and a difference value and a code are also "0."

When a gas appliance (for example, fan heater) corresponding to one of gas appliances 13, 14, 15 shown in FIG. 1 is activated at time "9" and a gas flow rate occurs, a measured flow rate changes, as shown with "flow rate value" in FIG. 4 and the graph in FIG. 5, from flow rate $Q(n)=0$ to flow rate $Q(n)\neq 0$, in other words, a flow rate changes in accordance with an amount of gas used. Along with measurement of a flow rate by flow rate measurement unit 104, arithmetic operation unit 108 calculates a difference value, and difference value converter 112 converts the difference value into a classification code. Classification codes converted from difference values are shown in a "code" column in FIG. 4. A gas appliance is determined by using, for example, a flow rate obtained after eight seconds from activation of the gas appliance. In this example, flow rates obtained in a period from time "9" to time "24" are used to determine a gas appliance.

When a code that is converted by difference value converter 112 and that falls within a predetermined range (for example, from code "1" to code "2" inclusive) continues for a first predetermined number of times (for example, three times or more and five times or less), appliance characteristic extractor 214 calculates an average value of flow rates at that time, and stores the average value as an intermediate steady flow rate. In the example shown in FIG. 4, a portion where code "1" or code "2" continues for three to five times corresponds to a portion from time "11" to time "13." Therefore, an average value of 52 L/h obtained from a flow rate of 54 L/h in time "11," a flow rate of 50 L/h in time "12," and a flow rate of 52 L/h in time "13" is stored as an intermediate steady flow rate.

In addition, when a code that is converted by difference value converter 112 and that falls within a predetermined range (for example, from code "1" to code "2" inclusive) continues for a second predetermined number of times (for example, six times), appliance characteristic extractor 214 calculates an average value of flow rates at that time, and stores the average value as a steady flow rate. In the example shown in FIG. 4, a portion where code "1" or code "2" continues for six times corresponds to a portion from time "19" to time "24." Therefore, an average value of 181.67 L/h obtained from a flow rate of 180 L/h in time "19," a flow rate of 184 L/h in time"20," a flow rate of 182 L/h in time "21," a flow rate of 180 L/h in time"22," a flow rate of 180 L/h in time"23," and a flow rate of 184 L/h in time"24" is stored as a steady flow rate.

As can be seen from the graph in FIG. 5, the stored intermediate steady flow rate corresponds to a gentle ignition flow rate (between change point (1) and change point (2) in the graph), and the steady flow rate corresponds to a flow rate that is steady immediately after ignition (after change point (3) in the graph), and an appliance characteristic flow rate is fully extracted.

As can be seen from the graph of code transition shown in FIG. 6, since peaks and bottoms of codes respectively represent change points (1), (2), and (3) shown in FIG. 5, when appliance characteristic extractor 214 extracts a peak value of the peaks and bottoms of codes, [05141] is extracted from a code string of [05111134333111111], and is stored as an appliance characteristic code string.

By storing, in appliance intrinsic characteristic information retainer 218, an appliance intrinsic intermediate steady flow rate representing an individual start-up characteristic for each gas appliance, a steady flow rate, and an appliance characteristic code string in advance, and comparing and determining an intermediate steady flow rate, a steady flow rate, and an appliance characteristic code string of a gas appliance being used, it can be determined that the gas appliance being used is one of a plurality of registered appliances or a new appliance.

For example, when, as a certain fan heater, information of an intermediate steady flow rate from 45 L/h to 60 L/h, a steady flow rate from 170 L/h to 190 L/h, and an appliance characteristic code string of [05141] is stored in advance in appliance intrinsic characteristic information retainer 218, since a result of the above-described detection coincides with contents of this information, it can be determined that the appliance being used is the certain fan heater.

As a method of calculating an intermediate steady flow rate and a steady flow rate, an average value of flow rates when a code within a predetermined range continues has been described. However, an average value may be calculated by adding a previous flow rate before a code within a predetermined range continues.

In this exemplary embodiment, as described above, in accordance with a gas pressure value measured by pressure measurement unit 132, measured flow rate corrector 136 corrects a gas flow rate value measured by flow rate measurement unit 104. Accordingly, even if pressure in a gas pipe differs from standard pressure depending on how the pipe is installed in a household, or due to a temperature in the gas pipe, or the like, an appliance can accurately be determined.

To further accurately determine an appliance, it is desired that, in a period during which a flow rate value is used to determine a gas appliance (in this example, from time "9" to time "24"), an interval for measuring pressure should be shortened to accurately perform correction. To this end, when a change in flow rate in response to activation of a gas appliance (for example, a change where a difference value is 5 or higher) is detected, measurement interval controller 138 determines that gas meter 100 has reached an appliance determination performing state, controls power supply unit 134, and sets an interval for turning on/off power supplied to pressure measurement unit 132 shorter to shorten an interval for measuring pressure. For example, in a period from time 9 to time 24, when gas meter 100 reaches an appliance determination performing state, pressure measurement unit 132 measures pressure at an interval of 0.5 seconds that is identical to a measurement interval of flow rate measurement unit 104. Therefore, a flow rate value can further accurately be corrected, and thus an appliance can accurately be determined.

Appliance determination unit 116 outputs operation information representing whether or not determination of an appliance is executed to measurement interval controller 138. Measurement interval controller 138 may determine that, based on this operation information, gas meter 100 has reached an appliance determination performing state, may control power supply unit 134, and may set an interval for turning on/off power supplied to pressure measurement unit 132 shorter to shorten an interval for measuring pressure.

After the end of the period during which a flow rate value is used to determine a gas appliance (in this example, after time "24"), measurement interval controller 138 controls power supply unit 134, and sets an interval for turning on/off power supplied to pressure measurement unit 132 longer to extend an interval for measuring pressure. Measurement interval controller 138 determines that, based on operation information output from appliance determination unit 116, gas meter 100 has shifted from the appliance determination performing state to an appliance determination non-performing state, and sets an interval for turning on/off power supplied to pressure measurement unit 132 longer. For example, in the appliance determination non-performing state, pressure measurement unit 132 measures pressure at an interval of two seconds. As described above, by extending an interval for measuring pressure after an appliance has been determined, power consumption can be suppressed, and a life of a battery can be extended.

In addition, in a period before time "9" where gas is not used (gas non-use state), by further extending an interval for measuring pressure, power consumption can further be suppressed. In a gas non-use state, a gas flow rate value is zero. When a gas flow rate value is zero, measurement interval controller 138 controls power supply unit 134, and sets an interval for turning on/off power supplied to pressure measurement unit 132 longer to extend an interval for measuring pressure. For example, in a gas non-use state, pressure measurement unit 132 measures pressure at an interval of 15 minutes. As described above, when no gas appliance is used, by extending an interval for measuring pressure, power consumption can further be suppressed, and a life of a battery can be extended.

In the above-described example, codes are used to extract a characteristic of a gas appliance. However, instead of using codes, a gas flow rate value may be used to extract a characteristic of a gas appliance. For example, when difference value $\Delta Q$ in flow rate, which falls within a predetermined range (for example, in a range from 0 L/h to 20 L/h inclusive), continues for a first predetermined number of times (for example, three times or more and five times or less), appliance characteristic extractor 214 may calculate an average value of flow rates at that time, and store the average value as an intermediate steady flow rate. In the example shown in FIG. 4, a portion where difference value $\Delta Q$ within a range from 0 L/h to 20 L/h inclusive continues for three to five times corresponds to a portion from time "11" to time "13." Therefore, an average value of 52 L/h obtained from a flow rate of 54 L/h in time "11," a flow rate of 50 L/h in time "12," and a flow rate of 52 L/h in time "13" is stored as an intermediate steady flow rate.

In addition, when difference value $\Delta Q$ in flow rate, which falls within a predetermined range (for example, in a range from 0 L/h to 20 L/h inclusive), continues for a second predetermined number of times (for example, six times), appliance characteristic extractor 214 calculates an average value of flow rates at that time, and stores the average value as a steady flow rate. In the example shown in FIG. 4, a portion where difference value ΔQ within a range from 0 L/h to 20 L/h inclusive continues for six times corresponds to a portion from time "19" to time "24." Therefore, an average value of 181.67 L/h obtained from a flow rate of 180 L/h in time "19," a flow rate of 184 L/h in time"20," a flow rate of 182 L/h in time "21," a flow rate of 180 L/h in time"22," a flow rate of 180 L/h in time"23," and a flow rate of 184 L/h in time"24" is stored as a steady flow rate.

As described above, instead of using codes, a gas flow rate value may be used to extract a characteristic of a gas appliance. In such a case, even though gas flow rate values are not uniform due to a manual operation or an ignition state, a flow rate representing a characteristic of an appliance under operation and a flow rate representing a characteristic of the appliance being stably operated can be identified, and thus the appliance can accurately be determined.

In addition, in this case, similarly, measurement interval controller 138 can determine a gas non-use state, an appliance determination performing state, or an appliance determination non-performing state, can control power supply unit 134 in accordance with the determined state, and can change an interval for turning on/off power supplied to pressure measurement unit 132 to accurately determine an appliance, and to suppress power consumption.

Figure 7:
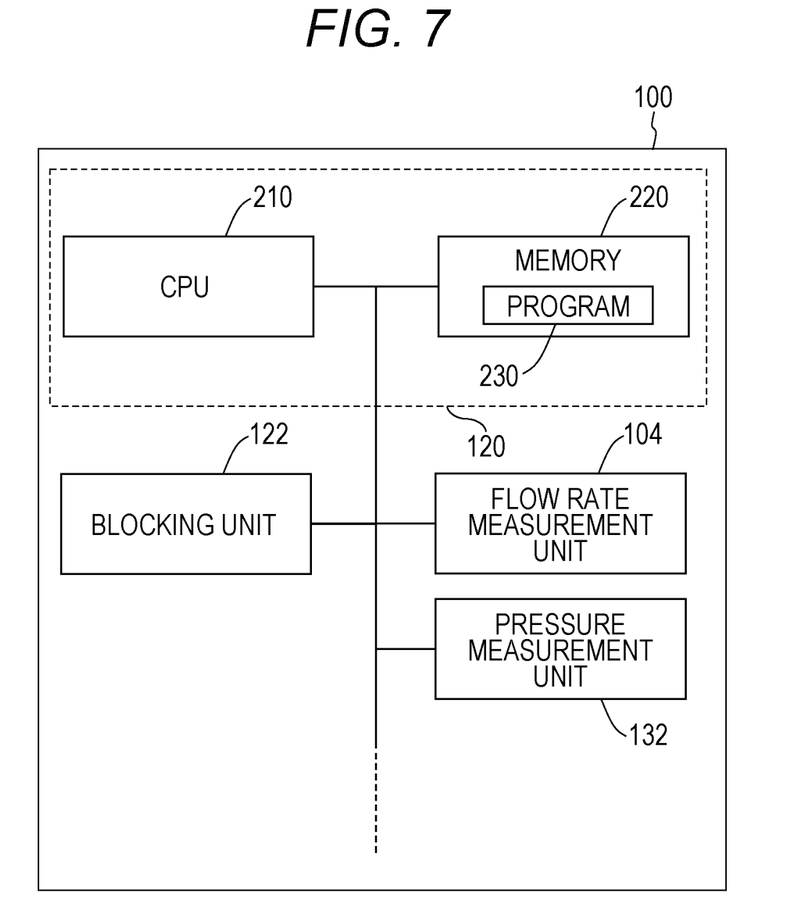
FIG. 7 is a diagram of the flow rate measurement device according to the exemplary embodiment of the present invention.

FIG. 7 is a diagram illustrating an example hardware configuration of gas meter 100. Gas meter 100 includes controller 120, flow rate measurement unit 104, pressure measurement unit 132, and blocking unit 122. Controller 120 includes central processing unit (CPU) 210, and memory 220.

CPU 210 executes computer program 230 stored in memory 220. In computer program 230, above-described various processes are described. CPU 210 executes various processes of arithmetic operation unit 108, difference value converter 112, appliance characteristic extractor 214, appliance determination unit 116, power supply unit 134, measured flow rate corrector 136, and measurement interval controller 138 shown in FIG. 1. Memory 220 is controlled by CPU 210, and operates as measured flow rate information storage 106, flow rate classification table retainer 110, and appliance intrinsic characteristic information retainer 218. As described above, by using CPU 210 and memory 220 to execute the above-described various processes, an appliance can accurately be determined.

The exemplary embodiment of the present invention has been described. The descriptions of the above exemplary embodiment are merely examples of the present invention, and are not intended to limit the present invention. In a possible exemplary embodiment, components described in the above exemplary embodiment may be combined as appropriate. In the present invention, any modification, replacement, addition, and omission can be made within the scope of the claims and their equivalents.

As described above, the flow rate measurement device according to the present invention includes a flow rate measurement unit for measuring, at a constant time interval, a flow rate of gas flowing in a passage, a pressure measurement unit for measuring pressure of the gas in the passage, a power supply unit for supplying power to the pressure measurement unit, and an appliance determination unit for determining an appliance being used based on the gas flow rate value. The flow rate measurement device further includes a measurement interval controller for determining a gas non-use state, an appliance determination performing state, or an appliance determination non-performing state based on a gas flow rate value and operation information of the appliance determination unit, for controlling the power supply unit in accordance with the determined state, and for changing an interval for turning on/off power supplied to the pressure measurement unit.

In the flow rate measurement device according to the present invention, the measurement interval controller may be configured to, when a current state is determined as an appliance determination performing state, set an interval for turning on/off power supplied to the pressure measurement unit shorter than an interval when a current state is determined as an appliance determination non-performing state or a gas non-use state.

In the flow rate measurement device according to the present invention, the measurement interval controller may be configured to, when a current state is determined as an appliance determination non-performing state, set an interval for turning on/off power supplied to the pressure measurement unit longer than an interval when a current state is determined as an appliance determination performing state, and shorter than an interval when a current state is determined as a gas non-use state.

In the flow rate measurement device according to the present invention, the measurement interval controller may be configured to, when a current state is determined as a gas non-use state, set an interval for turning on/off power supplied to the pressure measurement unit longer than an interval when a current state is determined as an appliance determination performing state or an appliance determination non-performing state.

The flow rate measurement device according to the present invention further includes a flow rate corrector for correcting a gas flow rate value measured by the flow rate measurement unit, based on a gas pressure value measured by the pressure measurement unit. The appliance determination unit may be configured to determine an appliance being used based on a gas flow rate value output from the flow rate corrector.

The flow rate measurement device according to the present invention further includes a flow rate corrector for correcting a gas flow rate value measured by the flow rate measurement unit, based on a gas pressure value measured by the pressure measurement unit. The measurement interval controller may be configured to determine a gas non-use state, an appliance determination performing state, or an appliance determination non-performing state based on a gas flow rate value output from the flow rate corrector and the operation information of appliance determination unit.

INDUSTRIAL APPLICABILITY

The present invention is particularly applicable to a field of technique for determining an appliance that uses a fluid.

What is claimed is:
1. A flow rate measurement device comprising:
a flow rate measurement unit for measuring, at a constant time interval, a flow rate of gas flowing in a passage;
a pressure measurement unit for measuring pressure of the gas in the passage;
a power supply unit for supplying power to the pressure measurement unit;
an appliance determination unit for determining an appliance being used based on a gas flow rate value; and a measurement interval controller for determining a gas non-use state, an appliance determination performing state, or an appliance determination non-performing state based on the gas flow rate value and operation information of the appliance determination unit, for controlling the power supply unit in accordance with the determined state, and for changing an interval for turning on/off power supplied to the pressure measurement unit.

2. The flow rate measurement device according to claim 1, wherein, when a current state is determined as the appliance determination performing state, the measurement interval controller sets an interval for turning on/off power supplied to the pressure measurement unit shorter than an interval when a current state is determined as the appliance determination non-performing state or the gas non-use state.

3. The flow rate measurement device according to claim 1, wherein, when a current state is determined as the appliance determination non-performing state, the measurement interval controller sets an interval for turning on/off power supplied to the pressure measurement unit longer than an interval when a current state is determined as the appliance determination performing state, but shorter than an interval when a current state is determined as the gas non-use state.

4. The flow rate measurement device according to claim 1, wherein, when a current state is determined as the gas non-use state, the measurement interval controller sets an interval for turning on/off power supplied to the pressure measurement unit longer than an interval when a current state is determined as the appliance determination performing state or the appliance determination non-performing state.

5. The flow rate measurement device according to claim 1, further comprising a flow rate corrector for correcting the gas flow rate value measured by the flow rate measurement unit, based on the gas pressure value measured by the pressure measurement unit, wherein the appliance determination unit determines an appliance being used based on the gas flow rate value output from the flow rate corrector.

6. The flow rate measurement device according to claim 1, further comprising a flow rate corrector for correcting the gas flow rate value measured by the flow rate measurement unit, based on the gas pressure value measured by the pressure measurement unit, wherein the measurement interval controller determines the gas non-use state, the appliance determination performing state, or the appliance determination non-performing state based on the gas flow rate value output from the flow rate corrector and the operation information of the appliance determination unit.

* * * * *